United States Patent [19]

Ross

[11] Patent Number: 5,449,056

[45] Date of Patent: Sep. 12, 1995

[54] ELECTRIC POWER DISTRIBUTION SYSTEM

[75] Inventor: Steven L. Ross, Pittsburgh, Pa.

[73] Assignee: U-S Safety Trolley Corp., Bridgeville, Pa.

[21] Appl. No.: 155,725

[22] Filed: Nov. 23, 1993

[51] Int. Cl.$^6$ .......................... B60L 1/00; B60M 1/36
[52] U.S. Cl. ............................................ 191/6; 191/15
[58] Field of Search .................... 191/2, 6, 14, 15, 20, 191/21, 22 R, 23 R, 25

[56] References Cited

U.S. PATENT DOCUMENTS

| 2,821,146 | 1/1958 | Mahrle et al. | 191/6 X |
| 2,824,911 | 2/1958 | Taylor | 191/25 |
| 3,002,059 | 9/1961 | Mageoch | 191/6 |
| 3,489,981 | 1/1970 | Corl et al. | 191/23 R X |
| 3,503,032 | 3/1970 | Routh et al. | 191/23 R X |
| 3,571,532 | 3/1971 | Falque | 191/23 A |
| 3,877,553 | 4/1975 | Ross | 191/49 |
| 3,918,557 | 11/1975 | Ross | 191/59.1 |
| 4,067,257 | 1/1978 | Pentith | 191/25 X |
| 4,550,231 | 10/1985 | Ross | 191/23 |

FOREIGN PATENT DOCUMENTS

| 1174023 | 3/1959 | France | 191/25 |
| 687367 | 2/1953 | United Kingdom | 191/23 |

Primary Examiner—Michael S. Huppert
Assistant Examiner—Scott L. Lowe
Attorney, Agent, or Firm—Carothers & Carothers

[57] ABSTRACT

An electrified pallet conveyor system for conveying appliances under electrical connection for testing, and which includes an electrical distribution contact shoe busway assembly. The busway consists of an elongated tubular housing having a continuous side access slot and a number of bus bar conductors mounted inside which coextend with the housing for conducting electricity. The electrical contact shoe assemblies are inserted at any desired location along the busway by inserting them into the access slot and twisting them 90°. These contact shoe assemblies are prevented from further rotation by the confines of a closure strip which closes the side access slot of the housing off on opposite sides of the contact shoe assembly. A keying mechanism is also provided to prevent lateral movement of the contact shoe assembly in the bottom of the bus bar housing. The contact shoe protrudes from its housing under spring bias and its extent of protrusion is limited by a stop provided by a pin which passes through the shoe and extends therebeyond to engage the underside of a lip on the housing.

25 Claims, 4 Drawing Sheets

ELECTRIC POWER DISTRIBUTION SYSTEM

BACKGROUND OF THE INVENTION

This invention relates generally to electric power distribution systems and more particularly pertains to electrifying conveying systems or a series of electrical devices.

In the electrical appliance industry, it is common practice to test an appliance under power while the unit is being moved along an assembly line. Such an assembly line requires a conveyor system with a mobile electrical power source or busway system.

There are presently two methods for accomplishing this. One method utilizes a trolley rail assembly with power pick-ups that are captive on the rail and electrically connected to the appliance. A second system utilizes a pallet containing conductive strips on its underside which engage individually mounted contact shoes (sometimes referred to as collector shoes or hot shoes) which are electrically powered. However, there are certain drawbacks associated with these prior art systems.

In the trolley rail solution, the power pick-up is often captive on the rail and also fixed to the pallet carrying the appliance. Hence it is difficult to remove a pallet from the assembly line if there should be some problem with the equipment. Sometimes the power pick-up is mounted directly onto the pallet, which takes up valuable pallet space. Additionally, such conveyor lines often make sharp turns, rotations and transfers which are difficult or impossible to negotiate with a trolley system.

In the contact shoe approach there are other problems. Namely, the shoes are typically mounted on some type of bar or rail by means of bolts, then connected to the electrical source through a terminal connector. This assembly is then sometimes covered with an insulating shield. The contact shoes are subject to wear and breakage under normal operation, and need to be replaced regularly. With this approach, replacement is very slow or time consuming and cumbersome, and often requires that the assembly line be shut down.

It is a principal object of the present invention to provide an electric power distribution system incorporating electrical hot shoe contacts or other types of pick-up contacts in a busway assembly which eliminates the aforedescribed disadvantages or drawbacks.

SUMMARY OF THE INVENTION

The present invention provides very simple and quick installation and removal of plug-in electrical pick-up assemblies in a continuous plug-in busway which permits the pick-up contacts to be placed anywhere along the length of the busway. The present invention also provides an electrical take-off or pick-up contact assembly of a twist plug-in type for a continuous channel busway which is not only easily connected or disconnected, but which is further provided with closure strips which close off the side access slot of the busway channel on opposite sides of the pick-up assemblies. The closure strip may be provided with a cut-out to receive a portion of the pick-up contact assembly therethrough such that the cut-out is keyed in shape to conform to angular outer contours of the assembly to thereby prevent rotation of the assembly and accidental dislodgement or disconnection from the busway.

An interengaging key mechanism is also provided between the pick-up contact assembly and internal portions of the busway rail or channel for keying or preventing lateral movement of the assembly within the elongated busway channel or tubular housing.

When the electric take-off or pick-up contact assembly is provided with a contact in the form of a collector shoe, the shoe is mounted and retained within an insulating holder under spring bias with portions of the shoe protruding from the holder for slide contact engagement with a strip contact. The shoe is displaceable into the assembly or holder under spring bias and a transverse passage is provided through the shoe and a pin is received through this passage and extends therebeyond on opposite ends for engaging the underside of a lip provided on the assembly housing or holder. This lip is thus positioned to engage the extended pin ends thereby providing a stop for maximum permissible protrusion of the shoe under spring bias from the holder portion of the pick-up assembly.

Multiple bus bar conductors may be provided in the busway channel or tubular housing and the quick twist plug-in pick-up assemblies permit the pick-up contacts to be easily connected to different circuits within the busway for increased current capacity or for different voltage or testing requirements in a hot pallet or other type of electrified conveyor system. In such conveyor applications, the structure of the present invention combines the advantages of a plug-in busway (ease of maintenance, convenience and flexibility) with the needs of conveyorized testing of appliances.

BRIEF DESCRIPTION OF THE DRAWINGS

Other objects and advantages appear in the following description and claims. The accompanying drawings show, for the purpose of exemplification without limiting the invention or claims thereto, certain practical embodiments illustrating the principals of this invention wherein:

DETAILED DESCRIPTION OF A PREFERRED EMBODIMENT

Figure 1:
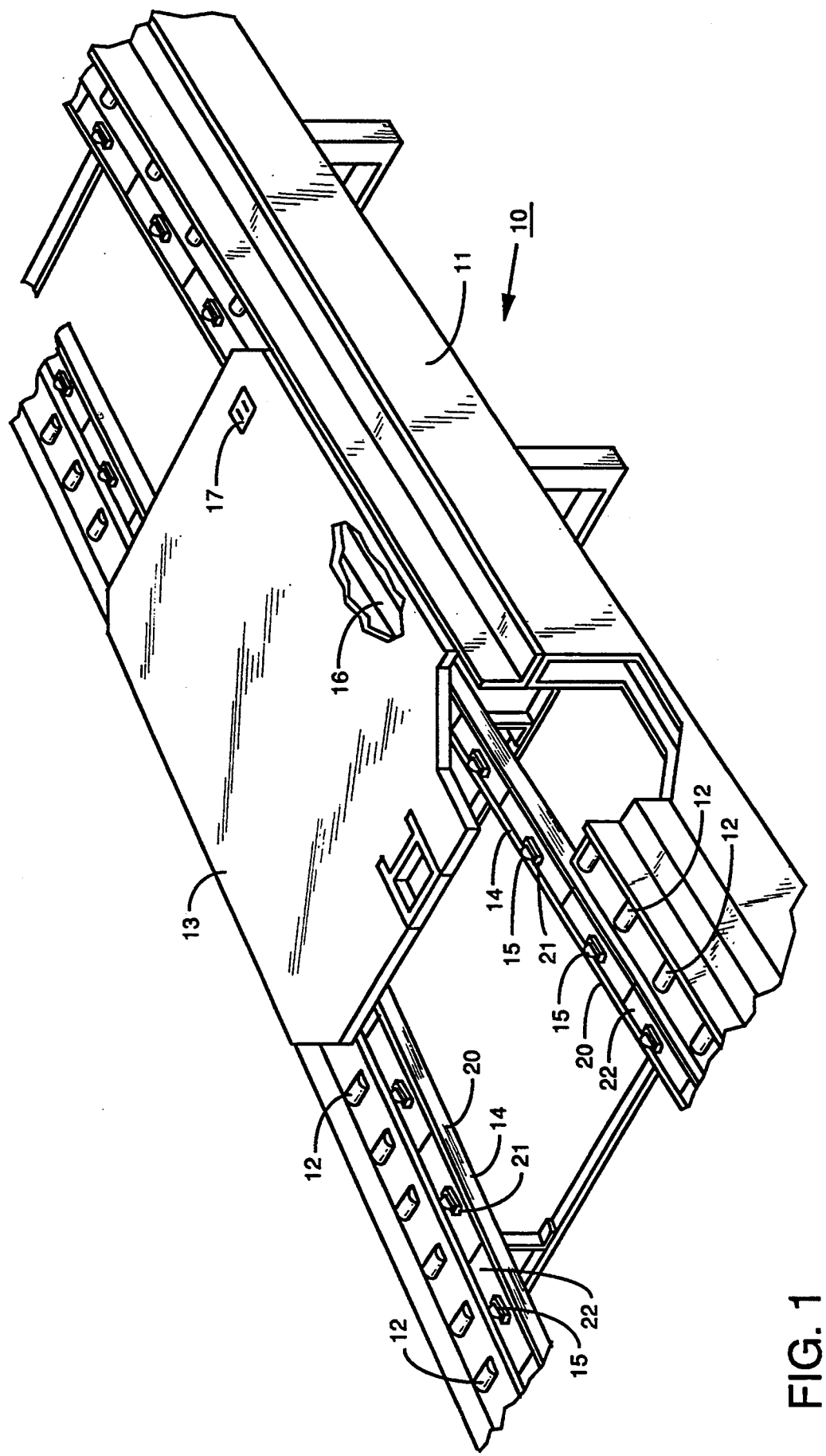
FIG. 1 is a perspective view of a portion of an electrified pallet conveyor system incorporating the electric power distribution system of the present invention.
Figure 2:
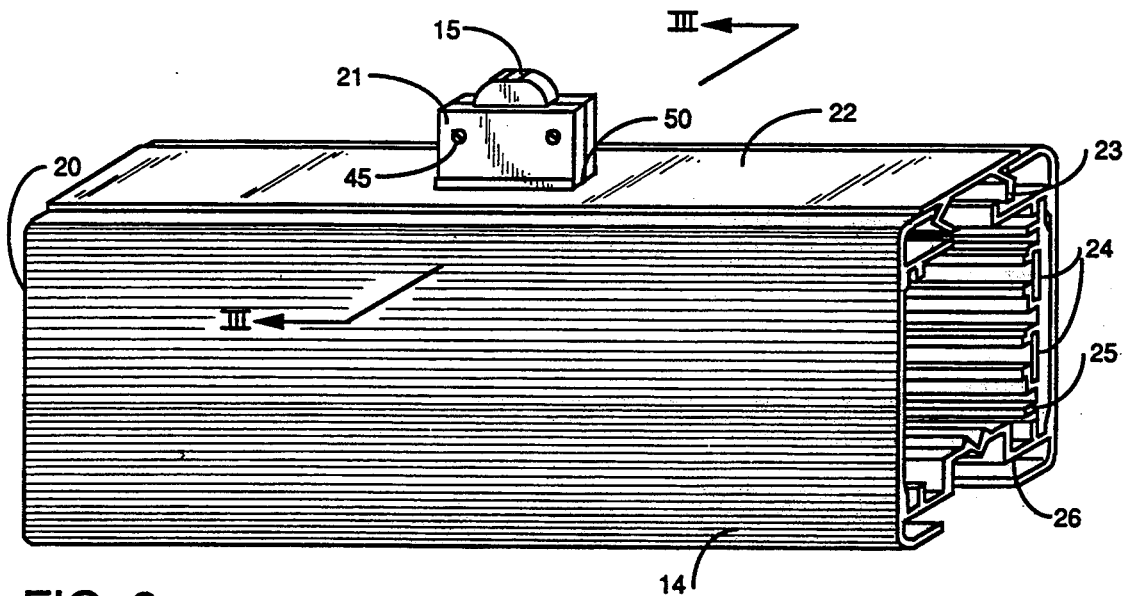
FIG. 2 is an enlarged isometric view of a segment of the electrical hot shoe contact busway assembly of the electric power distribution system of the present invention as shown in FIG. 1.
Figure 3:
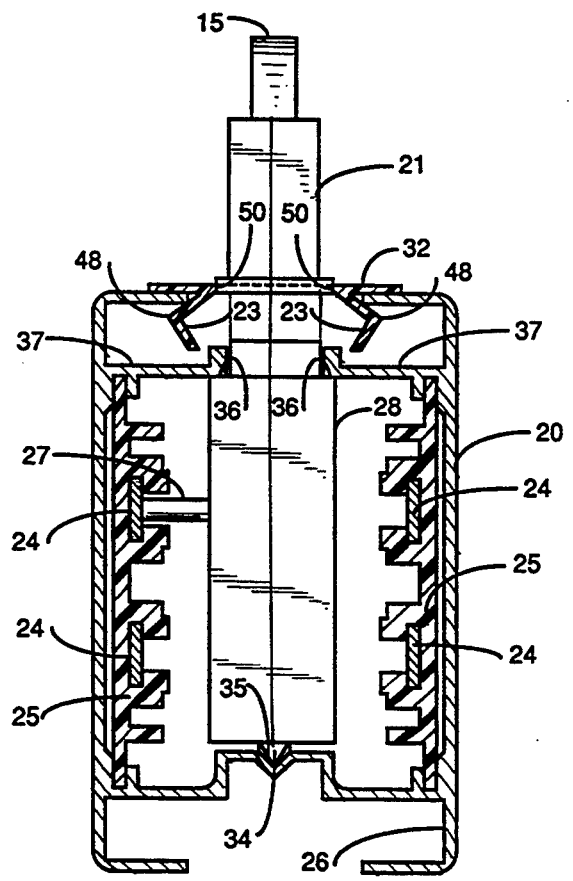
FIG. 3 is an enlarged view in vertical cross-section taken along the line III—III of the busway assembly of FIG. 1.

Referring to FIG. 1, a typical application of the electric power distribution system of the present invention is shown in conjunction with a hot or electrified pallet conveyor busway system. While the take-off or pick-up contacts are here illustrated as collector shoes, it should be kept in mind that certain aspects of the present invention are also applicable to other types of pick-up contact assemblies. However, one aspect of the present invention does pertain particularly to collector shoe type pick-up assemblies.

The pallet conveyor system illustrated in FIG. 1 shows a conveyor section 10 comprised of a conveyor frame 11, driven removable pallet conveyor rollers 12, appliance conveyor pallet 13 which rests upon and is driven along conveyor frame 11 by powered rollers 12, and a spaced pair of continuous electrical hot shoe contact busway assemblies 14 having electrical contact shoes 15 spaced therealong for electrical sliding engagement with contact strips 16 provided on the underside of pallet 13. Each pallet 13 is provided with a conventional electrical receptacle 17 for plugging in an appliance to be conveyed on pallet 13.

FIGS. 2 through 7 illustrate the details of one of the busway assemblies 14 of FIG. 1.

Each busway assembly 14 is comprised of an elongated tubular housing 20, which is a continuous mounting channel typically constructed of extruded aluminum, electrical contact shoe assembly 21, closure strip 22 closing continuous side access slot 23, and bus bar conductors 24 mounted in insulator strips 25 such that the bus bars and insulation strips coextend with the housing 20.

With more particular reference to FIGS. 3 through 7, tubular channel or housing 20 is provided with a continuous mounting channel 26 for receiving hanger supports or the like to rigidly mount the housing to conveyor frame 11 or other structures. The busway assembly 14 is provided in large sections which may be connected end to end in conventional fashion to provide the required length.

The collector shoe assembly 21 is a quick connect-/disconnect twist plug-in assembly for connection to housing 20 at any desired position therealong. Four electrical bus bar conductors 24 are provided in housing 20 to provide four independent electrical circuits. This particular design may accept one to four bus bar conductors 24. Contact shoe assembly 21 is constructed such that its spring biased bus bar contact pin 27 may be prepositioned to electrically contact or engage any one of the four bus bars 24. As may be best seen in FIG. 6 and FIG. 7, bus bar contact 27 is backed up with a compression spring 29 contained within the base portion 28 of holder 30. Holder 30 is molded of an insulating plastic and is provided in the form of identical vertically split halves 31 and 32 which are combined to make up holder 30 for pick-up assembly 21.

The two molded halves 31 and 32 of holder 30 are secured together in conventional fashion by means of self tapping screws 45.

Bus bar contact pin 27 is electrically connected to contact shoe 15 by flexible wire conductor 33.

Holder 30 is adapted for connection to housing 20 by insertion of base 28 into access slot 23 with the upper exposed portion of assembly 21 at right angles to housing 20 until distal protrusion 34 is received for bearing rotation in groove 35, which coextends with channel or housing 20 opposite access slot 23. Once this position is attained, the holder 30 is rotated 90° either left or right, depending upon which bus bar 24 contact 27 is to engage under spring bias.

Once holder 30 is thus rotated 90° to its insertion orientation position for electrical connection of the shoe 15 with a respective bus bar 24, the holder 30 is keyed to housing 20 at the bottom end thereof by the combination of protrusion 34 and groove 35 to prevent any lateral movement thereof. Lateral movement of the upper end of base 28 is also prevented due to the engagement of the holder annular neck which is directly above shoulders 36 and hold between flanges 37 of housing 20.

Holder 30 is designed such that bus bar contact pin 27 may be positioned to extend holder 30 in any one of four positions to engage a selected bus bar conductor 24.

Figure 5:
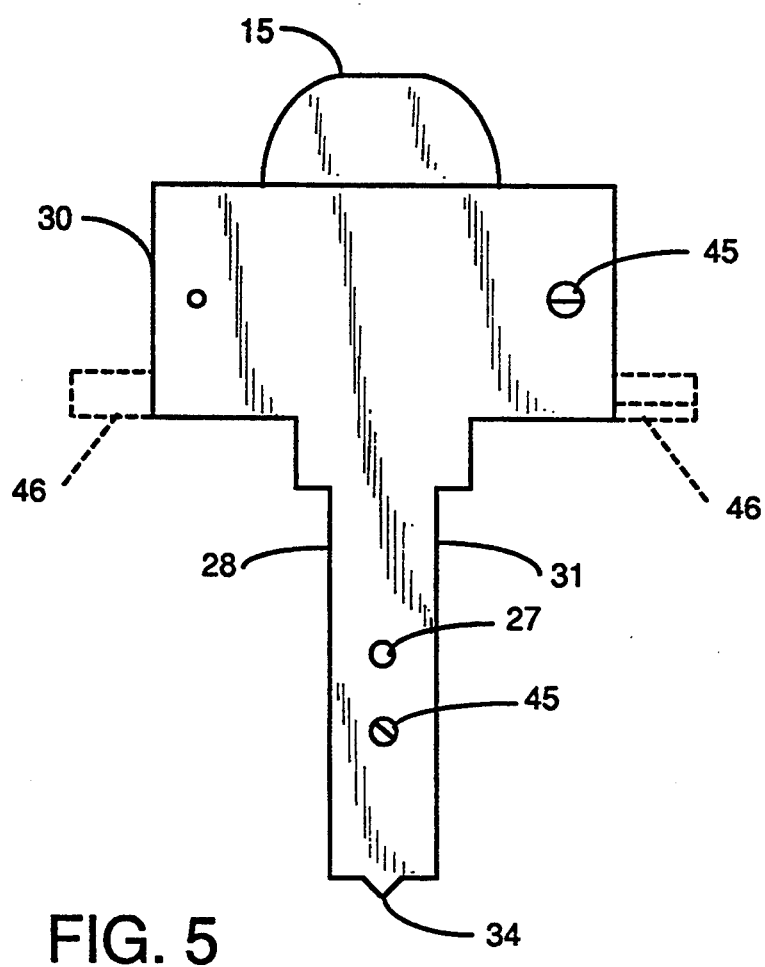
FIG. 5 is a view in side elevation of the collector or contact shoe assembly shown in FIG. 4 with the mounting ears removed.

For example, in FIG. 5 bus bar contact pin 27 extends through an opening predrilled into holder half 31 such that the head 37 of contact pin 27 may be slidably received within the confines of cylinder guide 38 internally of holder 30. However, in a similar manner, the opening may just as easily be provided at the bottom portion of base 28 concentrically or coaxially with cylinder guide 40 so that the contact pin 27 will protrude laterally through base 28 at a position or level such that contact pin 27 will engage one of the lower positioned bus bars 24 within housing 20.

Figure 7:
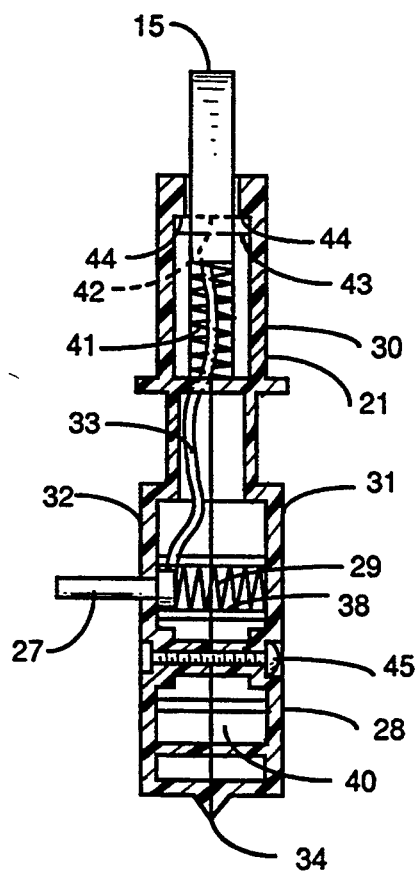
FIG. 7 is a view in vertical cross-section of the electrical contact shoe assembly shown in FIGS. 4, 5 and 6 as taken on the section line VII—VII of FIG. 4 with internal contact portions of the assembly left in full unsectioned form.

Electrical contact shoe 15 is retained in holder 30 under the bias of compression springs 41. A transverse passage 42 is provided through shoe 15 and a pin 43 is received through this passage and extends therebeyond on opposite ends, as best illustrated in FIG. 7, for engaging the underside of lip 44 of holder 30. Lip 44 is positioned to engage the extended ends of pin 43 thereby providing a stop for maximum permissible protrusion of shoe 15 under spring bias from holder 30.

This stop mechanism in the form of pin 43 and lip 44 provides a very novel and inexpensive stop mechanism. The hot shoes or collector shoes of the prior art require that the bottom of shoe 15 be provided with bored and tapped holes and additionally require a molded base which has to be secured to the bottom of the shoe by means of screws. Extending end portions of the molded base then act as stops, in a similar manner as due the extended ends of pin 43.

It can be readily seen that this prior art method is expensive to manufacture and requires considerable labor when compared to the stop assembly of the present invention as described and claimed herein.

Figure 4:
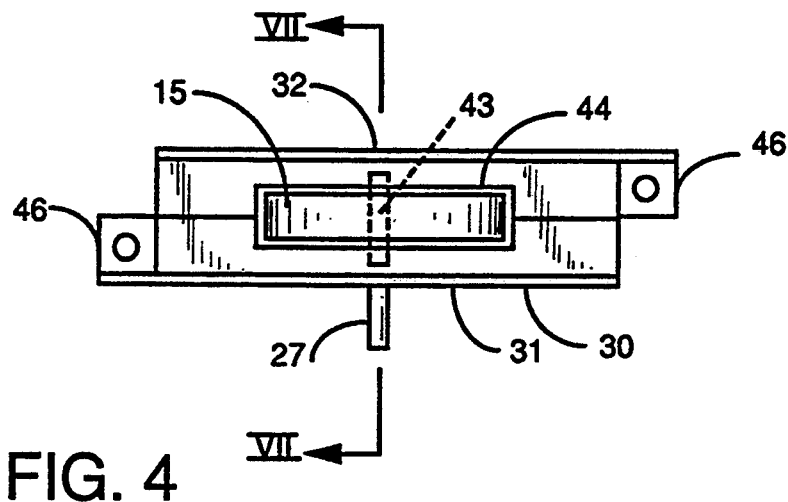
FIG. 4 is an enlarged plan or top view of the collector shoe assembly portion utilized in the electrical hot shoe contact busway system illustrated in FIGS. 1, 2 and 3.
Figure 6:
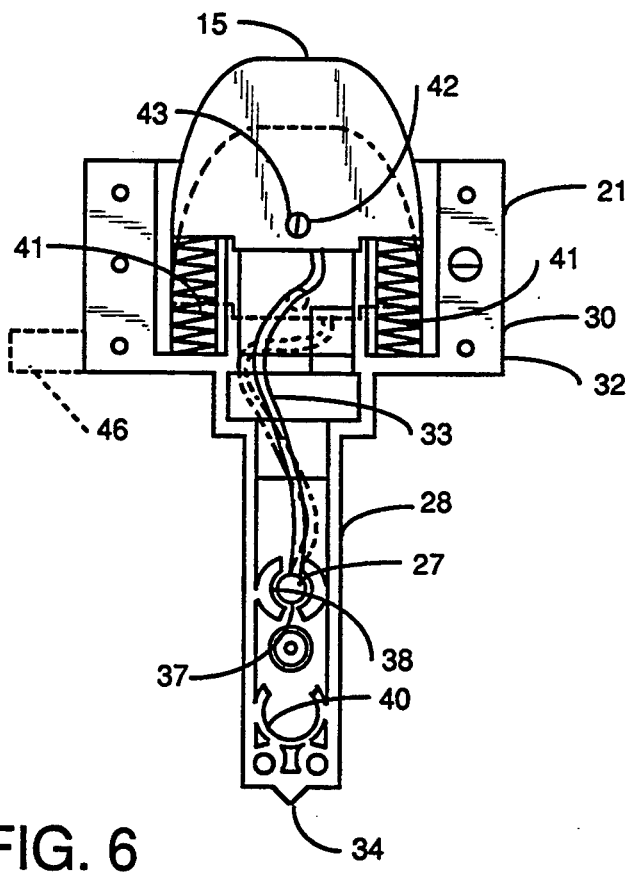
FIG. 6 is a view in side elevation of the contact shoe assembly shown in FIG. 5 with one half of the assembly removed for viewing the interior.

It should be noted, with particular reference to FIG. 4, that housing 30 is provided with integrally molded mounting ears 46 so that the base portion 28 of holder 30 may be completely removed and the holder 30 then mounted with mounting ears 46 in prior art systems such that the shoe assembly 21 of the present invention with its unique and inexpensive pin and lip stop mechanism may be used to replace hot shoe contacts of the prior art. However, in the busway system of the present invention which utilizes the twist plug-in holder 30, the ears 46 are removed as indicated in FIGS. 5 and 6, as they are not required and would be in the way.

Once the pick-up contact assemblies 21 are inserted into housing 20 and properly oriented for electrical connection, the access slot 23 is then closed off by means of flexible closure strips 22. Each strip 22 is provided with downwardly protruding and opposing snap flanges 48 which retain closure strip 22 within and over access slot 23.

Closure strips 22 may be cut to any desired length as required and they are provided with a cut-out 50 which is keyed in shape to conform to the angular outer contours of holder 30 for preventing rotation of holder 30 and accidental engagement of the pick-up contact assembly 21 with housing 20.

I claim:

1. An electrical hot shoe contact busway assembly for conveyor use comprising: an elongated tubular housing having a continuous side access slot coextending therealong, at least one elongated bus bar mounted inside said housing and coextending therewith for conducting electricity, an electrical contact shoe assembly including a conductive contact shoe mounted and retained in an insulating holder under spring bias with portions thereof protruding from said holder for electrical contact engagement with a passing collector contact such that said shoe is displaceable into said holder under spring bias, and quick connect/disconnect means on said holder and said housing for quick mechanical connection and disconnection of said holder in stationary relationship to said housing and simultaneous electrical connection and disconnection of said shoe to at least one of said at least one bus bar.

2. The busway assembly of claim 1, wherein said shoe assembly includes a passage provided through said contact shoe and a pin received through said passage and extending therebeyond on opposite ends for engaging a lip provided on said holder, said lip positioned to engage said extended pin ends and thereby providing a stop for maximum permissible protrusion of said shoe under said spring bias from said holder.

3. The busway assembly of claim 1 including removable strip closure means closing said access slot on opposite sides of said contact shoe assembly and said strip closure means consisting of an elongated flexible strip adapted for snap fit into and from said access slot to cover the same, and said strip having a cut-out therein to receive a portion of said shoe assembly therethrough for thereby exposing said contact shoe externally of said housing for electrical contact.

4. The busway assembly of claim 3, wherein said at least one bus bar is received and confined in a corresponding channel formed in an elongated insulator strip which is in turn retained in said housing, said quick connect/disconnect means including a spring biased contact extending from said holder and electrically connected to said contact shoe, said contact protruding into said channel and contacting said at least one bus bar under spring bias when said holder is inserted into said access slot and twisted 90° to a proper insertion orientation position of said holder for electrical connection of said shoe to said bus bar.

5. The busway assembly of claim 4, wherein said flexible strip cut-out is keyed in shape to conform to angular outer contours of said holder for preventing rotation of said shoe assembly after insertion of said strip into said access slot thereby preventing accidental dislodgement of said shoe assembly after attaining said proper insertion orientation position.

6. The busway assembly of claim 4, including interengaging key means on said housing and said holder for keying said holder from lateral movement within said tubular housing.

7. The busway assembly of claim 6, wherein said interengaging key means includes a longitudinal groove in said housing coextending therealong inside in parallel to and opposite from said access slot, and a guide protrusion extending from said holder for bearing protrusion into said groove thereby permitting rotation of said holder on said bearing protrusion and preventing lateral movement of said bearing protrusion and said holder.

8. The busway assembly of claim 7, wherein said bus bar is mounted along an inside side of said tubular housing between said access slot and said groove.

9. The busway assembly of claim 4, including a plurality of said at least one bus bars positioned in parallel with each other on inside sides of said housing as independent electrical conductors, and a plurality of said shoe assemblies respectively positioned along said housing for providing a plurality of electrical hot shoe contacts therealong.

10. The busway assembly of claim 9, wherein said contact shoes of the respective shoe assemblies are selectively electrically connected to different ones of said bus bars.

11. The busway assembly of claim 10, wherein said holder is adapted to retain said spring biased contact for each shoe assembly in one of a number of different possible positions for respective contact registry with different ones of said bus bars.

12. The busway assembly of claim 11, including pallet conveyor means for conveying a series of independent pallets along a conveyor line, said elongated tubular housing extending with and secured to said conveyor means, said pallets having an electrical contact strip on an underside surface thereof positioned and aligned for consecutive electrical sliding engagement with said contact shoes as said pallets progress along said conveyor means, and electrical plug-in means on each of said pallets electrically connected to said contact strip for plug-in electrical connection of an electronic or electrical device to be conveyed on said pallet.

13. An electric power distribution system including a hollow elongated channel housing containing parallel electrical bus bar conductors extending lengthwise thereof and having exposed inner surfaces and said housing having a continuous access slot coextending therealong, a twist plug-in electrical pick-up assembly for connection to said housing at any desired position therealong and comprising: at least one electric receptacle contact mounted in an insulating holder and at least one bus bar contact protruding from an extension base of said holder and respectively electrically connected to selected ones of said at least one receptacle contact, said holder constructed for connection to said housing by insertion of said base into and at right angles to said access slot and twisting said holder 90° for interengaging said holder with said housing and selectively contacting said at least one bus bar contact respectively with one or more of said bus bar conductors, a longitudinal groove in said housing coextending therealong inside in parallel with and opposite from said access slot, and a guide protrusion extending from said holder base for bearing protrusion into said groove to prevent lateral movement of said holder when interengaged with said housing.

14. The electric power distribution system according to claim 13, said at least one receptacle contact consisting of one elongated conductive contact shoe with portions thereof protruding from said holder for exposed contact engagement under spring bias such that said shoe is displaceable into said holder under spring bias, a transverse passage provided through said shoe and a pin received through said passage and extending therebeyond on opposite ends for engaging a lip provided on said holder, said lip positioned for engaging said extended pin ends and thereby providing a stop for maximum permissible protrusion of said shoe under said spring bias from said holder.

15. The electric power distribution system according to claim 14, including an elongated flexible closure strip adapted for snap fit into said access slot to cover the same on opposite sides of said holder, said strip having a cut-out therein to receive a portion of said holder therethrough for thereby exposing said shoe for electrical contact externally of said housing, said cut-out being keyed in shape to conform to angular outer contours of said holder for preventing rotation of said holder and accidental disengagement from said housing.

16. The electrical power distribution system according to claim 15, including a plurality of said pick-up assemblies respectively positioned along said housing for providing a plurality of electrical contact shoes therealong.

17. The electric power distribution system according to claim 16, including pallet conveyor means for conveying a series of independent removable pallets along a conveyor line, said elongated housing extending with and secured to said conveyor means, said pallets having an electrical contact strip on an underside surface positioned and aligned for consecutive electrical slide engagement with said contact shoes as said pallets progress along said conveyor means, and electrical plug-in means on each of said pallets electrically connected to said contact strip for plug-in electrical connection of an electronic or electrical device to be conveyed on said pallet.

18. An electrical distribution busway assembly comprising: an elongated tubular housing having a continuous side access slot coextending therealong, at least one elongated conductive bus bar mounted inside said housing and coextending therewith for conducting electricity, an electrical take-off connection assembly including an electrical take-off contact retained in an insulating holder for electrical take-off connection to a further take-off connector, quick connect/disconnect means on said holder and said housing for quick mechanical connection and disconnection of said holder in stationary relationship to said housing and simultaneous electrical connection and disconnection of said contact to at least one of said at least one bus bar, and interengaging key means on said housing and said holder for keying said holder from lateral movement within said housing.

19. The busway assembly of claim 18, wherein said interengaging key means includes a longitudinal groove in said housing coextending therealong inside in parallel to and opposite from said access slot, and a guide protrusion extending from said holder for vertically removable bearing protrusion into said groove thereby permitting rotation of said holder on said guide protrusion and preventing lateral movement of said bearing protrusion and said holder.

20. The busway assembly of claim 19, wherein said bus bar is mounted along an inside side of said tubular housing between said access slot and said groove.

21. The busway assembly of claim 20, wherein said bus bar is received and confined in a corresponding channel formed in an elongated insulator strip which is in turn retained in said housing, said quick connect/disconnect means including a spring biased bus contact pin extending from said holder and electrically connected to said electrical take-off contact, said bus contact pin protruding into said channel and contacting said bus bar under spring bias when said holder is inserted into said access slot with said guide protrusion bearing in said groove and is twisted 90° to an orientation position for electrical connection of said take-off contact to said bus bar.

22. The busway assembly of claim 21, including a plurality of said at least one bus bar positioned in parallel with each other on the same or opposite inside sides of said tubular housing as independent electrical conductors, and a plurality of said take-off contact assemblies positioned along said housing for providing a plurality of electrical take-offs therealong.

23. The busway assembly of claim 22, including a plurality of said take-off contacts in each of said holders and a respective plurality of said spring biased bus contact pins for each take-off contact for respective electrical connection of said take-off contacts to different ones of said bus contact pins.

24. The busway assembly of claim 22, including removable strip closure means closing said access slot on opposite sides of said take-off contact assemblies.

25. The busway assembly of claim 22, wherein said take-off contact is a conductive contact shoe retained in said insulating holder under spring bias with portions thereof protruding from said holder for contact engagement such that said shoe is displaceable into said holder under spring bias, a transverse passage through said shoe and a pin received through said passage and extending therebeyond on opposite ends for engaging a lip provided on said holder, said lip positioned to engage said extended pin ends and thereby providing a stop for maximum permissible protrusion of said shoe under spring bias from said holder.

* * * * *